US006211578B1

(12) United States Patent
Tamura

(10) Patent No.: US 6,211,578 B1
(45) Date of Patent: Apr. 3, 2001

(54) INSTRUMENTATION FOR VEHICLES

(75) Inventor: Shigeaki Tamura, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/331,675

(22) PCT Filed: Jul. 21, 1998

(86) PCT No.: PCT/JP98/03268

§ 371 Date: Jun. 23, 1999

§ 102(e) Date: Jun. 23, 1999

(87) PCT Pub. No.: WO99/21735

PCT Pub. Date: May 6, 1999

(30) Foreign Application Priority Data

Oct. 23, 1997 (JP) .................................................. 9-290886

(51) Int. Cl.[7] ........................................................ B60L 1/00

(52) U.S. Cl. ............................................ 307/10.1; 307/9.1

(58) Field of Search .................................... 307/9.1, 10.1; 455/6.3, 456

(56) References Cited

U.S. PATENT DOCUMENTS

| | | | | |
|---|---|---|---|---|
| 4,792,783 | * | 12/1988 | Burgess et al. | 307/10.1 |
| 5,471,389 | * | 11/1995 | Hahlganss | 364/424.05 |
| 5,697,048 | * | 12/1997 | Kimura | 455/6.3 |
| 5,990,571 | * | 11/1999 | Sato et al. | 307/10.1 |

FOREIGN PATENT DOCUMENTS

| | | |
|---|---|---|
| 209072 | 7/1987 | (EP) . |
| 61-143227 | 9/1986 | (JP) . |
| 4-48657 | 4/1992 | (JP) . |
| 6-276571 | 9/1994 | (JP) . |
| 7-203553 | 8/1995 | (JP) . |
| 7-277035 | 10/1995 | (JP) . |
| 9-275636 | 10/1997 | (JP) . |
| 10-254382 | 9/1998 | (JP) . |
| 10-60601 | 9/1998 | (JP) . |
| 10-267699 | 10/1998 | (JP) . |
| 10-69497 | 10/1998 | (JP) . |

* cited by examiner

*Primary Examiner*—Josie Ballato
*Assistant Examiner*—Sharon Polk
(74) *Attorney, Agent, or Firm*—McDermott, Will & Emery

(57) ABSTRACT

A instrumentation system is disclosed for providing improved reliability when used in a vehicle. The vehicle instrumentation system includes a plurality electronic component units and a reference portion which functions as a platform. The electronic component units have connecting portions, while the reference portion has mounting portions that have a plug-in structure. The electronic component units are mounted to the reference portion via the mounting portions. The vehicle instrumentation system receives current through the connecting portion of one of the electronic component units and through the connector of the reference portion. Current through the reference portion is prevented from introducing noise through the connecting portions of the electronic component units because it passes directly from the vehicle battery through a fuse box.

2 Claims, 3 Drawing Sheets

1
6
71
3
34
UNLOCK
LOCK
31
4
43
42
422
421
b
a
41
412
411
TO VARIOUS PORTIONS
15
44
16
200
100
300
M
A
B

INSTRUMENTATION FOR VEHICLES

TECHNICAL FIELD

The present invention relates to instrumentation devices for vehicles and, more particularly, to instrumentation devices for capable of offering improved reliability.

BACKGROUND ART

In recent years, various electronic components and devices, such as an illuminated key entry system, a defogger timer, a seat belt warning system, a light turning-off reminding warning system, a key takeout reminding warning system, power door locks, and a keyless entry system, have been independently installed and distributed in a vehicle. These electronic components are electrically connected with a meter unit mounted in front of the driver's seat. The electronic components are controlled by system means such as a microcomputer incorporated in the meter unit. The state of the vehicle detected by the electronic components is displayed on the meter unit if necessary for example, see Japanese Unexamined Patent Publication No. 203553/1995.)

Integration of the distributed, independent electronic components is considered as a means for achieving cost reduction. The combination of the required electronic components differs according to the vehicular specifications for specific climatic areas or the vehicle grade. Therefore, if electronic components are integrated simply according to the combination, then the number of variations increases. Consequently, large cost reduction cannot be expected.

Japanese Unexamined Patent Publication No. 276571/1994 discloses a multiplexed transmission device for a vehicular electric system. This multiplexed transmission device is separate from electronic components, unlike the prior art device. Since these two kinds of systems can be separately developed and manufactured, it is possible to prevent the total number of components including both electronic components and multiplexed transmission device from increasing. Even with this structure, however, the number of variations described above cannot be sufficiently decreased.

Accordingly, the present applicant has proposed novel means in Japanese Patent Application Nos. 60601/1997 and 69497/1997. In particular, electronic components other than the meter unit are classified and integrated into plural electronic component units. Mounting means are provided to mount and detach the electronic component units to and from the meter unit. A control portion for controlling the electronic component units and a power-supply portion for supplying electric power to the electronic component units are mounted in the meter unit. The electronic component units are controlled and energized via the mounting means. The present invention is an improvement over this proposed instrumentation system. It is an object of the present invention to improve the reliability of instrumentation devices.

DISCLOSURE OF THE INVENTION

The present invention provides an instrumentation system comprising at least two electronic component units and a reference portion having a given electric circuit. Electronic components are classified and integrated into the aforementioned electronic component units according to their amounts of electric power consumption. The reference portion receives external electrical signals and is electrically energized from the outside. The reference portion becomes an electrical and mechanical reference part for the electronic component units. The electronic component units through which a large current flows are energized without passing current through the electric circuit in the reference portion.

The invention also provides an instrumentation system comprising at least two electronic component units, a display portion for providing a desired display, and a reference portion. Electronic components are classified and integrated into the aforementioned electronic component units according to their amounts of electric power consumption. One of the electronic component units is used as a main unit for providing a control of the whole instrumentation system, thus providing a desired display on the display portion. The reference portion receives external electrical signals and is electrically energized from the outside. The reference portion has a given electric circuit such that this portion becomes an electrical and mechanical reference part for the electronic component units. The reference portion serving as the electrical and mechanical reference part can selectively connect the electronic component units. The electronic component units through which a large current flows are energized without passing current through the electric circuit in the reference portion.

BEST MODE FOR CARRYING OUT THE INVENTION

An embodiment of the present invention is hereinafter described with reference to the accompanying drawings.

Figure 1:
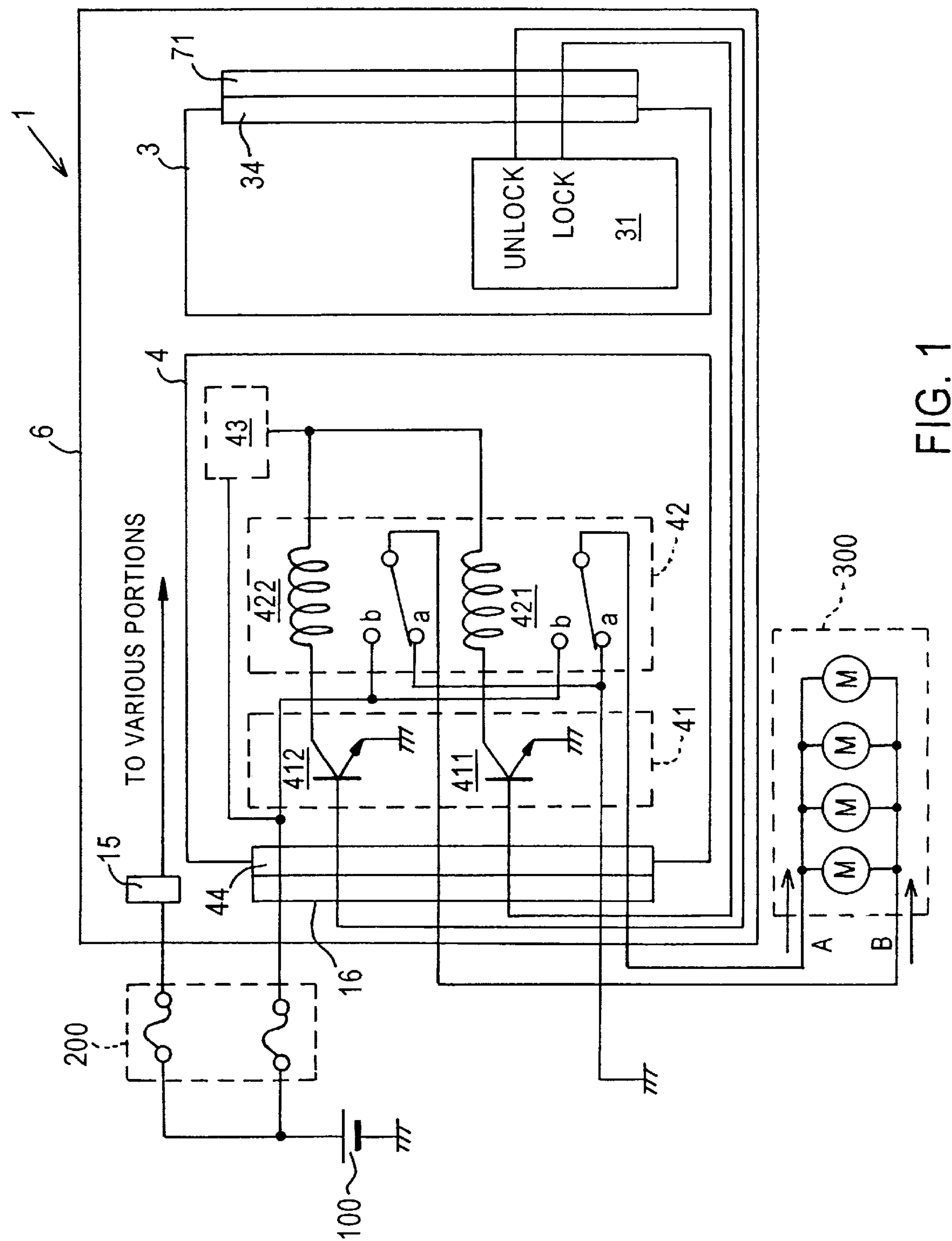
FIG. 1 is a circuit block diagram of main portions of an instrumentation system in accordance with an embodiment of the present invention.
Figure 2:
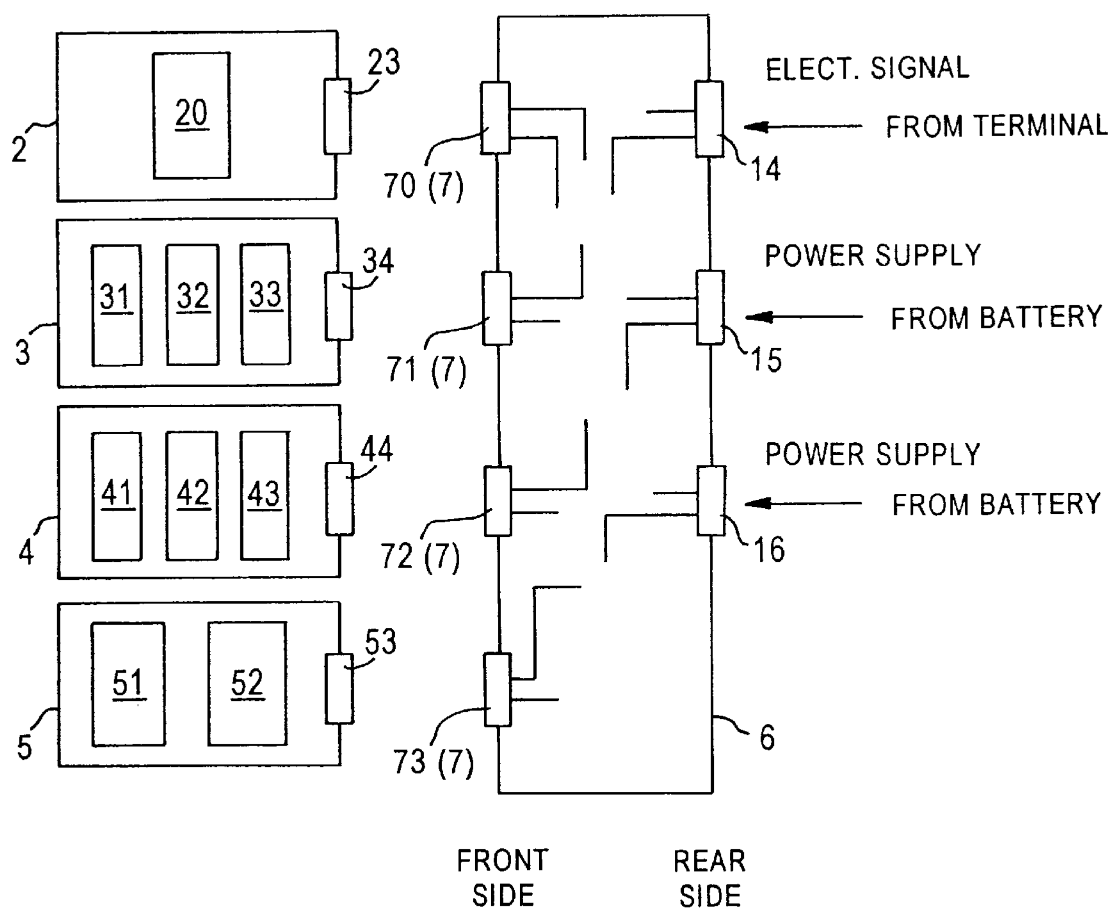
FIG. 2 is a block diagram of main portions of the prior art instrumentation system.
Figure 3:
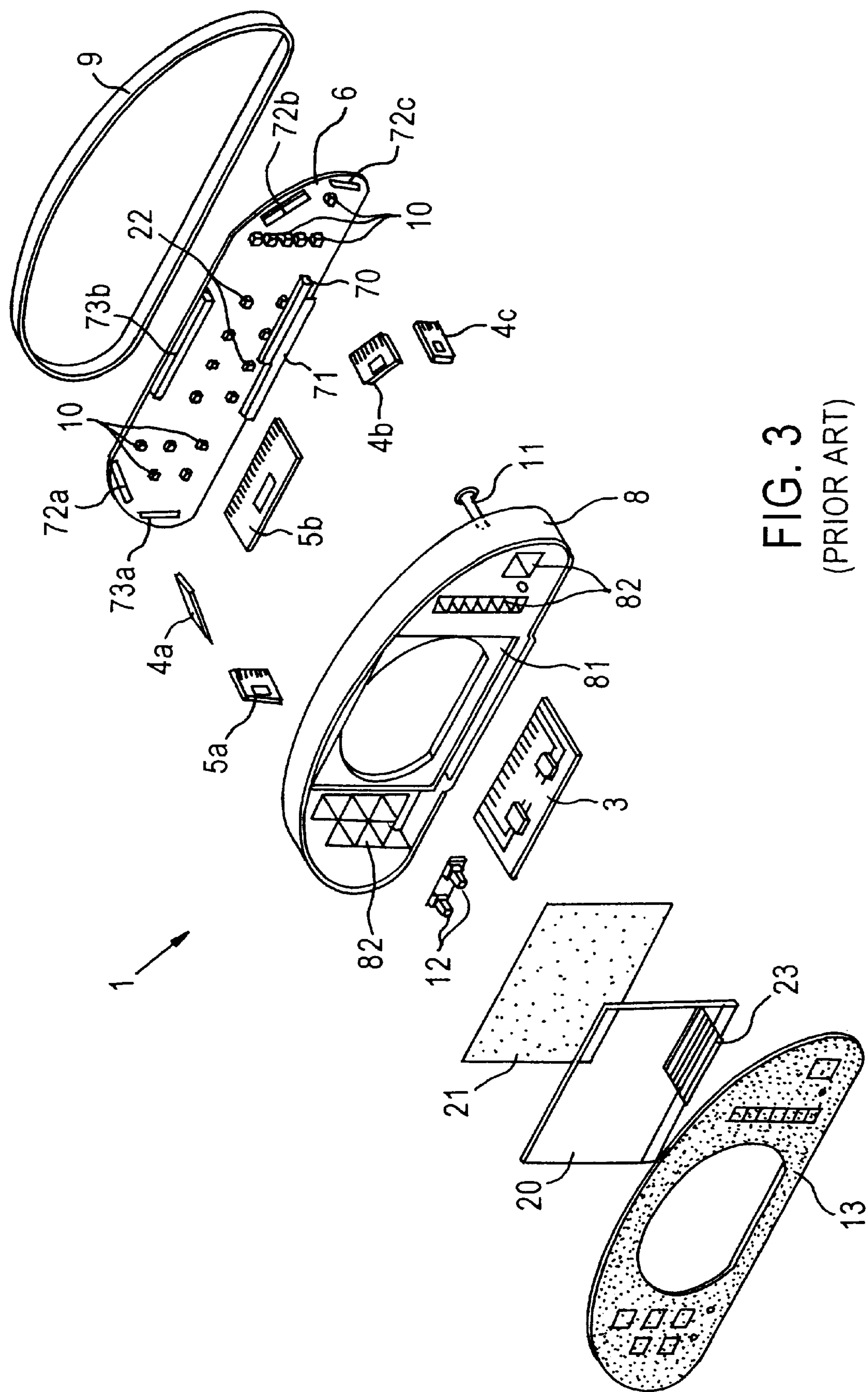
FIG. 3 is a schematic exploded perspective view of the prior art instrumentation system.

FIGS. 2 and 3 show the prior art structure corresponding to the present invention. FIG. 1 shows an embodiment of the invention. Note that like components are indicated by like reference numerals.

Referring to FIGS. 1 and 2, a vehicle instrumentation system 1 has a display portion 2 for providing various displays, electronic component units 3–5 each having a single function or plural functions integrated, and a reference portion 6. This reference portion 6 acts as a mounting reference part for various components such as the display portion 2 and the electronic component units 3–5. The reference portion 6 serves also as an electrical reference part. The reference portion comprises a mother board consisting of a printed wiring board. A pattern of electric circuitry (not shown) is created on the board by printing the pattern with a conductive material, and acts to distribute signals and electric power. Plural mounting portions 7 permitting one to connect at least the connector portions of the electric component units 3–5 in one touch are mounted to the front side. The mounting portions 7 are mounted to the rear side of the case 8 of the body of the vehicle instrumentation system 1. A rear cover 9 is mounted to the rear side.

The display portion 2 has a centralized displaying function of the vehicle instrumentation system 1. The display portion 2 displays information about the operation such as vehicle speed and engine speed, information about the present position using GPS satellites, environmental information such as interior temperature and outside temperature of the vehicle according to the results of processing performed by the electronic component units 3–5. A step portion 81 is formed on the center of the body case 8. The display portion 2 comprises a liquid crystal panel (LCD) 20 placed on the step portion 81, a light-diffusing plate 21 located behind the LCD 20, and a plurality of light-emitting diodes (LEDs) 22 in the form of chips. The LEDs 22 are mounted to the reference portion 6 and backlight the LCD 20. This LCD 20 has exposed terminals (not shown) and metal connecting pins 23 having clip-like ends connected to the exposed terminals of the LCD. The display portion 2 and the reference portion 6 are electrically connected simply by inserting the other ends of the pins 23 into a female connector 70 for the LCD, the female connector 70 being one of the mounting portions 7.

Various electronic components are classified and organized into the three electronic component units 3–5, taking account of their functions and their amounts of electric power consumption. These units 3–5 are inserted in peripheral portions of the body case 8 left as dead spaces. For example, the first electronic component unit 3 has a control member 31, a storage member 32, and a power-supply member 33 on a daughter board consisting of a printed wiring board. The control member 31 consists of an electronic part such as a microcomputer for controlling the display portion 2 and the electronic component units 4, 5. The storage member 32 consists of an electronic part such as a flash memory for holding a program that specifies processing in the control member 31. The power-supply member 33 consists of an electronic part for supplying electric power to the display portion 2 and to the low-current electronic component unit 5 (described later). Thus, the first unit 3 forms a main unit for controlling the whole instrumentation system. A connecting circuit pattern 34 is exposed from the lower end of the daughter board that is one of its ends. This exposed pattern forms a connecting portion. The daughter board is placed almost vertical to the surface of the reference portion 6 by inserting this connecting circuit pattern 34 into the female connector 71 for the main unit, the female connector 71 being one of the mounting portions 7. The electronic component unit 3 and the reference portion 6 are connected mechanically and electrically.

The second electronic component unit 4 comprises a keyless door lock circuit (4*a* in FIG. 3), a retractable mirror circuit (4*b* in FIG. 3), an automated antenna circuit (4*c* in FIG. 3), and other circuits consuming relatively large amounts of electric current i.e., (greater than 2 amperes). The second electronic component unit 4 has an input circuit 41 consisting of electronic parts connected with sensors, switches, or other detectors (not shown), an output circuit 42 consisting of electronic parts connected with an electric motor, a relay, or other control device (not shown), and a large-current power-supply circuit 43 consisting of electronic parts on a daughter board consisting of a printed circuit board. A connecting circuit pattern 44 is exposed from the lower end of the daughter board that is one of its ends. This exposed pattern forms a connection portion. The daughter board is placed almost vertical to the surface of the reference portion 6 by inserting the connecting circuit pattern 44 into large-current unit female connectors 72 (such as 72*a*, 72*b*, and 72*c* shown in FIG. 3) that are some parts of the mounting portions 7. Thus, the electronic component unit 4 and the reference portion 6 are connected mechanically and electrically.

The third electronic component unit 5 comprises a warning circuit (such as Sa in FIG. 3), a keyless receiver circuit (such as 5*b* in FIG. 3), and other electronic components consuming relatively small amounts of electric current i.e., (less than 1 ampere). The third unit 5 has an input circuit 51 consisting of electronic parts connected with sensors, switches, and other detectors (not shown) and an output circuit 52 consisting of electronic parts connected with relays, actuators, and other control devices (not shown) on a daughter board consisting of a printed wiring board. A connecting circuit pattern 53 that forms a connecting portion is exposed from the lower end of the daughter board that is one of its ends. The daughter board is placed almost vertical to the surface of the reference portion 6 by inserting this connecting circuit pattern 53 into small-current unit female connectors 73 (such as 73*a* and 73*b* in FIG. 3) that are some parts of the mounting portions 7. In this way, the electronic component unit 5 and the reference portion 6 are connected mechanically and electrically.

Referring to FIG. 3, there are shown LEDs 10 for indicating the gear position of a car with automatic transmission and making various warnings, a selector knob 11 for switching the mode of indication between distance and time, a selector switch 12 for selection of display, and a decorative panel 13 mounted on the front surface of the body case 8. The panel 13 is printed with desired ornament. The LEDs 10 face a cylindrical portion 82 of the body case 8 and turn on and off or flicker on the decorative panel 13 The selector knob 11 and the selector switch 12 are electrically connected with the reference portion 6 and extend forwardly of the decorative panel 13 and thus become exposed. In consequence, a user can manually operate the knob 11 and the selector switch 12.

In FIG. 1, a connector 14 is an input/output port for transmitting and receiving electrical signals between the electronic component units 3–5 and terminals (not shown) mounted at various vehicle locations such as sensors and actuators, using serial multiplexing communications means or the like. A connector 15 is an input/output port for supplying electric power or a voltage from the battery (not shown) to the electronic component unit 4. A connector 16 is an input/output port for supplying the electric power or voltage from the battery to the electronic component units 3 and 5. These connectors 14–16 are mounted on the rear side of the reference portion 6. The rear cover 9 is provided with holes (omitted in FIG. 2) through which the connectors 14–16 face the outside.

In this vehicle instrument system 1 described above, the electric power or voltage from the battery 100 is supplied to the electronic component units 3 and 5 via the connector 15 that is an input/output port. Also, the electric power or voltage from the battery 100 is supplied to the electronic component unit 4 via the connector 6 that is an input/output port. The electric power is supplied from the connector 16 to the electronic component unit 4 via the electric circuit pattern on the reference portion 6. Since a large current flows through the electronic component unit 4, noise may be introduced in other electric circuits close to the electric circuit pattern. This might adversely affect the electronic component units 3 and 5 through which only small currents flow.

Accordingly, the present invention provides an improvement a s illustrated in FIG. 1. The large-current electronic component unit (door lock circuit) 4 is connected with the power supply connector 16 via a fuse box (junction block) 200 to receive the electric power from the battery 100. The connecting circuit pattern 44 of the electronic component unit 4 is directly connected with this connector 6. Electric power passed through the fuse box 200 passes into the reference portion 6 via the connector 15 in the same way as in the conventional structure to provide a power supply in other applications. That is, the female connectors 72 for the large-current unit is integrated with the connector 16.

As mentioned previously, the electronic component unit 4 comprises the input circuit 41 connected with detector devices, the output circuit 42 connected with control devices, and the large-current power supply circuit 43 composed of electronic parts. In particular, the input circuit 41 of the unit 4 is a transistor circuit driven under control of the control member 31 of the electronic component unit 3 that provides various controls of the vehicle instrumentation system 1. The output circuit 42 of the unit 4 is a relay circuit that controls electric motors 300 for locking and unlocking the vehicle doors according to the operation of the input circuit 41.

In this structure, if a lock signal, for example, is sent under control of the control member 31, a transistor 411 in the input circuit 41 is turned on, thus actuating a relay 421 in the output circuit 42. The contacted point is switched to contact b. A current flows through the motors 300 in the direction indicated by the arrow A, thereby locking the door. Conversely, if an unlock signal, for example, is sent under control of the control member 31, a transistor 412 in the input circuit 41 is turned on, actuating a relay 422 in the output circuit 42. As a result, the contacted point is switched to the contact b. A current flows through the motors 300 in the direction indicated by the arrow B. This opens the doors.

When the doors are locked or unlocked, a current of about 5 amperes flows through each motor 300. The electronic component unit 4 is directly connected with the connector 16 by the connecting circuit pattern 44, and an electric circuit is formed without via the electric circuit of the reference portion 6. Therefore, the possibility that the other electronic component units 3, 5, and so on are adversely affected via the electric circuit is very low. This can enhance the reliability of the vehicle instrumentation system 1.

The electronic component units 3, 4, and 5 are connected mechanically and electrically by inserting the connecting circuit patterns 34, 44, 53 directly into the connectors 71, 72, and 73, the patterns 34, 44, 53 being formed at the lower ends of their respective the daughter boards. Alternatively, connectors may be mounted to the daughter boards and brought into engagement with the connectors 71–73 to make mechanical and electrical connections.

In this way, the vehicle instrumentation system 1 can accommodate variations in vehicle grade and climatically determined specifications by the combination of the electronic component units 4 and 5. The reference portion 6, the body case 8, the rear cover 9, and so on can be designed as common parts. Therefore, the number of component variations can be reduced greatly. This is effective in reducing the cost. Modifications in the system according to the variations can be easily accomplished by rewriting the contents of the storage member 32 in the electronic component unit 3 or replacing the storage member 32. It is easy to cope with the variations. The assembly can be done more efficiently.

Furthermore, the electronic component unit 4 through which a relatively large current flows is made separate from the other electronic component unit 5. During operation of the unit 4, the other electronic component unit 5 is prevented from being adversely affected by the unit 4. This improves the noise immunity and the reliability of the vehicle instrumentation system 1.

Electric power is supplied to the large-current electronic component unit 4 without via the electric circuit of the reference portion 6. Therefore, the possibility that the other electronic component units 3, 5, and so on are adversely affected via the electric circuit is very low. This can enhance the reliability of the vehicle instrumentation system 1.

The electronic component units 3–5 are not limited to those given in the above embodiment. Of course, any arbitrary combination may be selected. Although various examples of electronic components of the electronic component units 4 and have been presented, other electronic component units such as electronic component unit for voice recognition and voice synthesis used for a man-machine interface system, security electronic parts used for keyless entry and a central door lock system, and electronic parts used for transmission of information for wireless or telephone communication systems may be integrated into units according to their amounts of electric power consumption.

Electrical signals regarding the electronic component units 3–5 are not always required to be sent from the connector 14 that is an input/output port via the reference portion 6. For example, input/output ports may be mounted directly on the electronic component units 3–5, and connections may be made.

In the present embodiment, the display portion 2 uses the LCD 20 and thus is of the electronic type. Instead, a mechanical type using a cross-coil movement or the like may be used. In this case, the electronic component units 3–5 may be placed around this movement, and a structure similar to that shown in the above embodiment may be adopted. Furthermore, the invention may be applied to the vehicle instrumentation system 1 in which the display portion 2 is remote from the reference portion 6.

INDUSTRIAL APPLICABILITY

In accordance with the present invention, an electronic component unit that consumes a relatively large amount of electric current is formed separately from other electronic component units that do not. This imparts improved noise immunity and reliability to the vehicle instrumentation system.

In one feature of the invention, the electric circuitry is so constructed that electric power is supplied to the large-current electronic component unit without via the electric circuit of the reference portion. Therefore, the possibility that the other electronic component units are affected adversely via the electric circuit is very low. Hence, noise immunity and reliability are enhanced.

What is claimed is:

1. A instrumentation for vehicles comprising:

at least one first electronic component unit consuming relatively large amounts of electric current;

at least one second electronic component unit consuming relatively small amounts of electric current, said second electronic component unit being separate from said first electronic component unit;

a reference portion having a given electric circuit and having an electrical and mechanical connection to said first and second electronic component units, said reference portion receiving external electrical signals and electric power such that said electric power is supplied to said first electronic component unit directly from a batty of the vehicle through a fuse box.

2. A instrumentation for vehicles comprising:

at least one first electronic component unit consuming relatively large amounts of electric current;

at least one second electronic component unit consuming relatively small amounts of electric current, said second electronic component unit being separate from said first electronic component unit;

one of said first and second electronic units being used as a main centralized unit for controlling instruments;

a display portion for providing a given display under control of said main centralized unit;

a reference portion having a given electric circuit and having an electrical and mechanical connection to said first and second electronic component units, said reference portion receiving external electrical signals and electric power such that said electric power is supplied to said first electronic component unit directly from a battery of the vehicle through a fuse box; and said first and second electronic component units being capable of being selectively connected to said reference portion.

* * * * *